United States Patent
Balogh et al.

(10) Patent No.: US 7,978,683 B2
(45) Date of Patent: Jul. 12, 2011

(54) METHOD OF TRANSFERRING CALL TRANSITION MESSAGES BETWEEN NETWORK CONTROLLERS OF DIFFERENT RADIO TECHNOLOGIES

(75) Inventors: Dan Anthony Balogh, Madison, NJ (US); Michael Francis Dolan, Bolingbrook, IL (US); Richard Paul Ejzak, Wheaton, IL (US); Douglas N. Knisely, Wheaton, IL (US); Subhasis Laha, Aurora, IL (US); Chung-Zin Liu, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1513 days.

(21) Appl. No.: 10/823,579

(22) Filed: Apr. 14, 2004

(65) Prior Publication Data

US 2005/0243870 A1 Nov. 3, 2005

(51) Int. Cl.
*H04L 12/66* (2006.01)
*H04L 12/28* (2006.01)

(52) U.S. Cl. .................................. 370/352; 370/401

(58) Field of Classification Search ........... 370/310–314, 370/338, 389, 401, 400, 331, 352–356
See application file for complete search history.

(56) References Cited

U.S. PATENT DOCUMENTS

| | | | | |
|---|---|---|---|---|
| 6,400,946 B1* | 6/2002 | Vazvan et al. | ............... | 455/432.1 |
| 7,164,912 B2* | 1/2007 | Buckley et al. | ............ | 455/435.2 |
| 7,194,550 B1* | 3/2007 | Chamdani et al. | ........... | 709/238 |
| 7,359,347 B2* | 4/2008 | Ahmavaara et al. | .......... | 370/328 |
| 2002/0087674 A1* | 7/2002 | Guilford et al. | ............... | 709/223 |
| 2004/0008669 A1* | 1/2004 | Bos et al. | ........................ | 370/352 |
| 2004/0240430 A1* | 12/2004 | Lin et al. | ........................ | 370/352 |
| 2004/0246990 A1* | 12/2004 | Krishnamurthi et al. | ...... | 370/466 |
| 2005/0227691 A1* | 10/2005 | Pecen et al. | ................ | 455/435.2 |

* cited by examiner

*Primary Examiner* — Hong Cho
(74) *Attorney, Agent, or Firm* — Harness, Dickey & Pierce

(57) ABSTRACT

The method provides for a first network controller, operating according to a first radio technology, to form and send a relay message to a second network controller, operating according to a different, second radio technology. The relay message includes an embedded message for the second network controller. The embedded message may be a transition message requesting transition of a packet switched call for a mobile station handled by the first network controller to a call for the mobile station handled by the second network controller. The method further provides selection of another wireless element for service at a wireless unit, using a current wireless element. A wireless unit receives a message identifying at least one other wireless element, available to the wireless unit and to which a wireless element currently in communication with the wireless unit is also in communication with and the wireless unit selects another wireless element for possible future service based on the message.

37 Claims, 9 Drawing Sheets

FIG. 9

| Base Station ID | Radio Pilot Channel -522 | Network Type -524 | Able to Relay Information -526 |
|---|---|---|---|
| BS2 | HRPD Channel 30 | HRPD | Yes |
| BS3 | HRPD Channel 33 | HRPD | Yes |
| BS4 | Pilot Number Offset 13 | 3G1X | Yes |
| BS5 | Pilot Number Offset 11 | 3G1X | No |
| BS6 | Channel 7 | 802.11B | No |
| BS7 | Channel 10 | 802.11B | Yes |
| BS8 | Channel X | UMTS | Yes |
| BS9 | Channel Y | UMTS | No |

METHOD OF TRANSFERRING CALL TRANSITION MESSAGES BETWEEN NETWORK CONTROLLERS OF DIFFERENT RADIO TECHNOLOGIES

BACKGROUND OF THE INVENTION

1. Field the of the Invention

The present invention relates to telecommunication; and more particularly, methods for transferring call transition messages between network controllers of different radio technologies.

2. Description of Related Art

When a mobile station moves within a wireless network, one communication station (e.g., base station, etc.) may transfer (e.g., according to well-known call handoff procedures) the communication needs of the mobile station to another communication station in the network. To the mobile station user, this transition is seamless in that the communication from and to the mobile station is substantially uninterrupted.

However, no mechanism currently exists for providing such a seamless transition when the mobile station moves between different radio networks or technologies or portions of a same subscriber network operating according to different radio technologies.

SUMMARY OF THE INVENTION

The present invention anticipates that methods developed to seamlessly transition packet switched (e.g., voice-over IP or VoIP) calls from one radio technology network to packet or circuit switched calls on a different radio technology network will benefit from being able to transfer messages associated with call transition between network controllers of the two different radio technologies and by being able to select between multiple radio technologies.

According to one exemplary embodiment of the present invention, a first network controller operating according to a first radio technology forms and sends a relay message to a second network controller operating according to a different, second radio technology. The relay message includes an embedded message for the second network controller. The embedded message may be a transition message requesting transition of a packet switched call for a mobile station handled by the first network controller to a call for the mobile station handled by the second network controller.

For example, according to one embodiment, the transition message is an origination message for originating a call at the second network controller. The origination message may be for originating a packet switched call or a circuit switched call at the second network controller. When a packet switched call is being originated, the relay message may further include an identifier of a packet data serving node currently handling the packet switched call handled by the first network controller.

As another example, the transition message may be a handoff request requesting handoff of the mobile station to the second network controller. The handoff request may be for requesting handoff of the packet switched call as a packet switched call or a circuit switched call.

When the second network controller receives the transition message, the second network controller sends a relay message including a channel assignment message to the first network controller. The channel assignment message indicates a channel assigned to the mobile station for communicating with the second network controller. The first network controller will relay this message on to the mobile station.

Furthermore, when the transition is from a packet switched call to a packet switched call, the second network controller may establish a signaling relationship with the packet data serving node identified in relay message received at the second network controller such that the second network controller receives packetized traffic destined for the mobile station.

Exemplary embodiments of the present invention may also allow a serving system to inform a mobile station or handset about the existence of multiple other systems of potentially multiple other radio technologies, which neighbour the mobile handset. Exemplary embodiments of the present invention may allow a serving system to inform a mobile handset about the existence of other services of the other multiple other radio technologies, which neighbour the mobile handset. Exemplary embodiments of the present invention may allow the mobile handset to select another available system and/or a particular service of the other available system, to transfer services to, in the event a transfer is desired. Exemplary embodiments of the present invention may allow the mobile handset to signal the selection to the serving network.

Exemplary embodiments of the present invention may allow system and/or service selection prior to transfer of service. Exemplary embodiments of the present invention may allow system and/or service selection among multiple available systems and/or services.

Exemplary embodiments of the present invention may allow the serving system to provide existence information about multiple other available serving systems, and/or to receive an indication from the mobile handset about a preference for transfer to a particular other system.

Exemplary embodiments of the present invention may allow the serving system to relay messages between the mobile handset and the selected other available system. Exemplary embodiments of the present invention may allow the mobile handset to identify to the serving system that a single message and/or all subsequent messages are to be relayed by the serving system to and/or from the selected other available system. In the event a single message is identified, subsequent messages may also be identified as intending to be relayed by a subsequent indication message.

In a exemplary embodiments of the present invention, a method of communication between wireless elements and a wireless unit may include sending at least one message identifying at least one network type of the wireless elements available to the wireless unit and which wireless element is in use by the wireless unit. In other exemplary embodiments of the present invention, a method of communication between wireless elements and a wireless unit may further include receiving a selection of at least one wireless element from the wireless unit. In other exemplary embodiments of the present invention, a method of communication between wireless elements and a wireless unit may include receiving at least one message identifying at least one network type of the wireless elements available to the wireless unit and which wireless element is in use by the wireless unit and selecting at least one wireless element for possible future service based on the message.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 9 illustrates an example of message 52 of FIG. 8 in accordance with an exemplary embodiment of the present invention.

DETAILED DESCRIPTION OF EMBODIMENTS

The present invention anticipates that methods developed to seamlessly transition VoIP calls from one radio technology network to VoIP or circuit switched calls on a different radio technology network will benefit from being able to transition messages associated with call transition between network controllers of the two different radio technologies and by being able to select between multiple radio technologies.

Transferring Messages and Call Transfer

For purposes of explanation only, the embodiments of the present invention related to transferring message and call transfer will use the example of transitioning a packet switched call (e.g., a Voice-over-IP or VoIP call) carried over a cdma2000 3G1X-EVDO based network (hereinafter the DO network) to either a VoIP call or a circuit switched call carried over a cdma2000 3G1X-EVDV based network (hereinafter the DV network). Initially, an architecture of the two networks and their relationship with a core network will be described. Then, the various methods of transferring messages will be described in the context of different call transfer scenarios.

Figure 1:
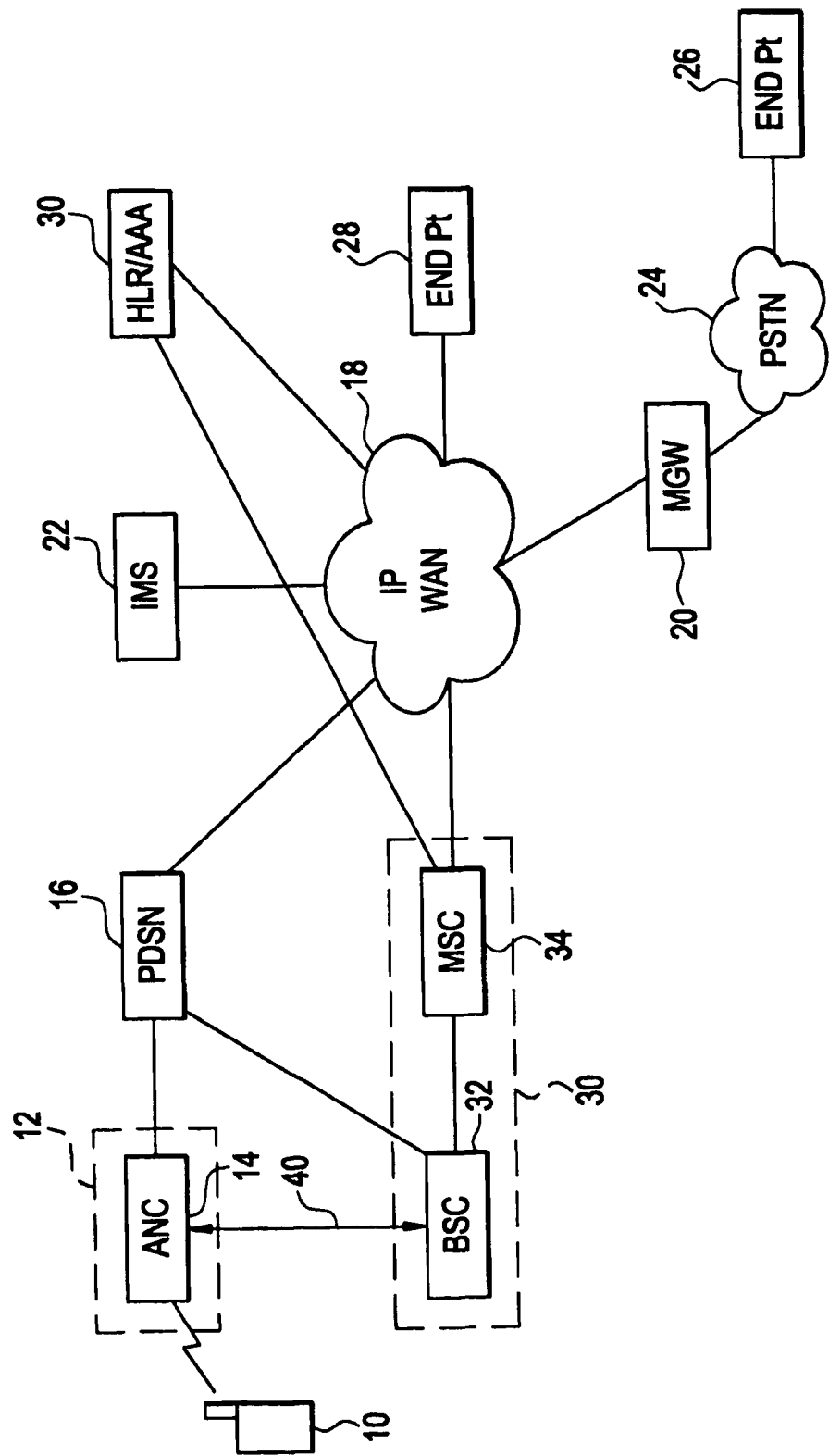
FIG. 1 illustrates a system architecture of a cdma2000 3G1X-EVDO network and a cdma2000 3G1X-EVDV network and their relationship with a packet call controller (e.g., an IP multimedia subsystem (IMS) as shown)

FIG. 1 illustrates a system architecture of a cdma2000 3G1X-EVDO network and a cdma2000 3G1X-EVDV network and their relationship with a packet call controller (e.g., an IP multimedia subsystem (IMS) as shown). As shown, a mobile station or user equipment (UE) 10 communicates with a high rate packet data (HRPD) access network controller (ANC) 14 in a DO network 12. The terms mobile station and user equipment will be used interchangeably and generically throughout this application as any device (phone, PDA, computer, etc.) capable of wireless communication, and should not be interpreted as limited to a particular standard. The mobile station 10 supports the air interface signaling for both the DO network 12 and the DV network 30 (discussed below), and supports the ability to switch between a stable VoIP call state to a stable circuit voice call state. Also, as will be appreciated, a DO network 12 includes many more aspects than the HRPD ANC 14; however, for purposes of clarity, these other elements have not been shown.

The ANC 14 sends the VoIP traffic received from the mobile station 10 to a packet data serving node (PDSN) 16. The PDSN 16 routes the VoIP traffic to an end point 28 over an IP wide area network (WAN) 18. The end point 28 may be a computer connected to the internet, a VoIP phone directly connected to the IP WAN 18, another mobile station connected to the IP WAN 18 in the same or similar manner that mobile station 10 is connected, etc. Alternatively, the VoIP bearer traffic is routed to a media gateway (MGW) 20. The MGW 20 converts the VoIP bearer traffic to a suitable communication format for a public switched telephone network (PSTN), and routes the converted voice call over a PSTN 24. The PSTN 24 connects the call to an end point 26 such as a telephone connected to the PSTN 24. For purposes of explanation only, the VoIP session will be described as being between the mobile station 10 and the end point 28. The call control path between the mobile station 10 and the end point 28 traverses the HRPD ANC 14, the PDSN 16, the IP WAN 18, and the IMS 22. The call control path between the mobile station 10 and the end point 26 traverses the HRPD ANC 14, the PDSN 16, the IP WAN 18, the IMS 22, and the PSTN 24. The HRPD ANC 14, the PDSN 16, and the IP WAN 18 support transport of IP packets with the appropriate quality of service (QoS) and do not otherwise influence signaling messages on the call control path or bearer traffic on the bearer path.

The routing within the IP WAN 18 is managed by a packet call controller such as a IP multimedia subsystem (IMS) 22 as defined in 3GPP TS 23.228 and related specifications, and shown in FIG. 1. According to an embodiment of the present invention, the IMS 22 serves as a proxy for the SIP signaling related to the VoIP session between the mobile station 10 and the end point 28. Throughout this disclosure, examples of SIP signaling are according to the well-known SIP protocol version 2.0, defined in IETF RFC 3261 and related specifications.

FIG. 1 further shows a DV network 30 and associated connections with the architecture described above. As shown, the DV network 30, like the DO network 14, includes a network controller—a base station controller (BSC) 32 that may provide communication services to the mobile station 10. A BSC is the DV network counterpart to an ANC in a DO network. The BSC 32 provides for routing VoIP traffic to the PDSN 16 when the DV network 30 supports packet switched communication, and provides for routing circuit switched call traffic to a circuit switching controller—a mobile switching center (MSC) 34—in support of circuit switched communication. As is known, a DV network may support both packet switched and circuit switched communication or only circuit switched communication. But, a DO network does not provide circuit switched communication. Accordingly, no counterpart to the MSC exists in a DO network.

The MSC 34 manages operation of the BSC 32, and also provides for routing circuit switched traffic from the BSC 32 to the IP WAN 18 by performing interworking between circuit switched call control signaling and bearer traffic within the DV network 30 and the VoIP call control signaling and VoIP bearer traffic within the IMS 22 and IP WAN 18. The MSC 34 has IP interfaces for SIP signaling and voice media with the IP WAN 18 and the IMS 22, and may support a handoff notification procedure as described in detail below.

The home location register & authentication, authorization and accounting server (HLR/AAA) 30 shown in FIG. 1, also known as a home subscriber server (HSS), is the repository of subscriber-related data such as defined in the 3GPP or 3GPP2 standards. In addition to the well-known HLR/AAA procedures, the HLR/AAA 30 may support a serving MSC address notification procedure as described in detail below.

According to the embodiments of the present invention, as shown in FIG. 1, the ANC 14 may communicate with the BSC 32. This communication may take place over a tunnel medium 40 such as an IP network (e.g., the internet), an ATM network, T1 trunking, etc.

Figure 2:
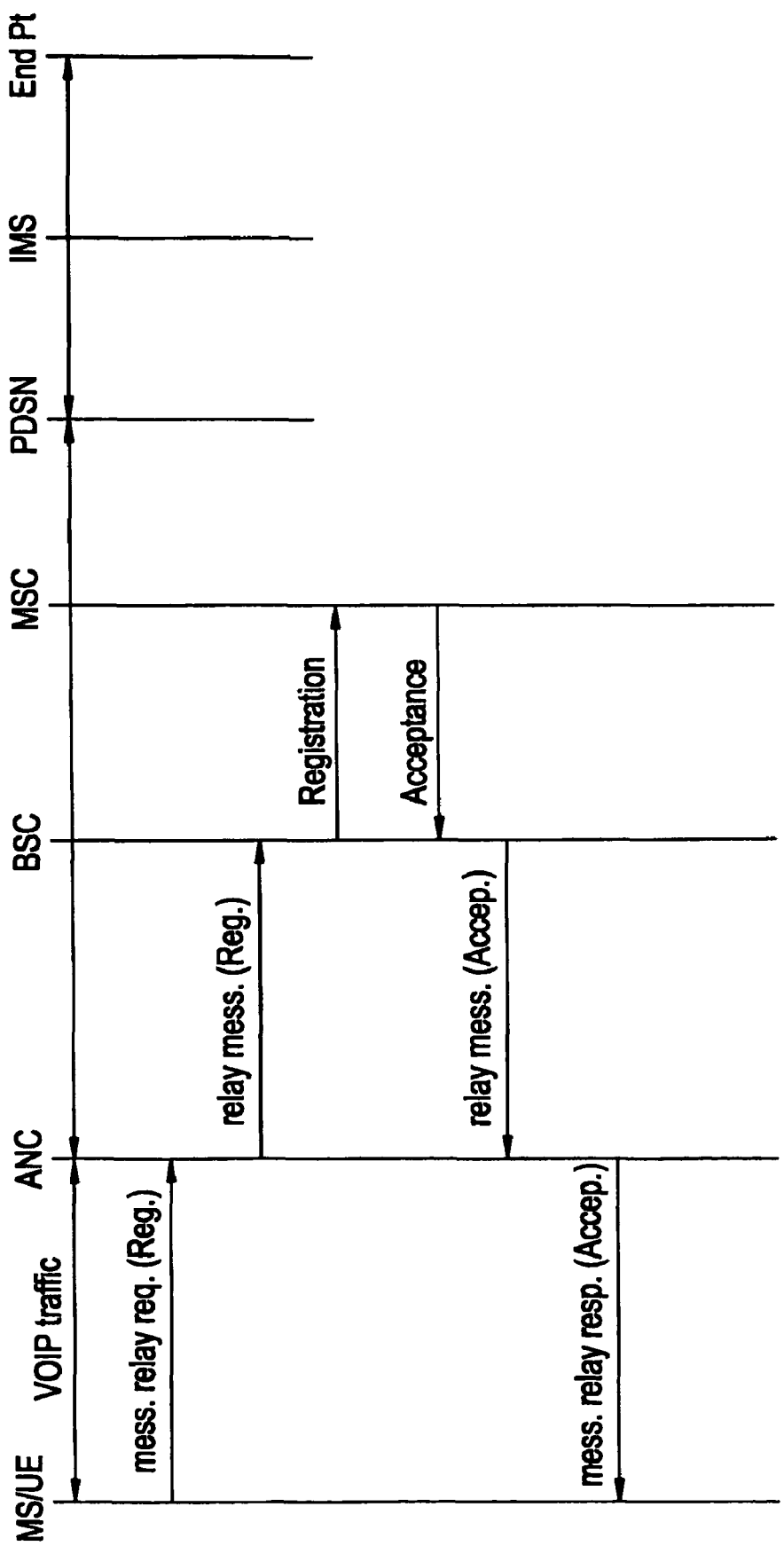
FIGS. 2-6 illustrates a call flow diagrams of call flows in the architecture of FIG. 1 according to example embodiments of the present invention.

Next, an example of transferring a registration message for the DV network 30 over the DO network 12 will be described with respect to the call flow diagram illustrated in FIG. 2. As shown, while a mobile station 10 is involved in a VoIP call carried over the DO network, the mobile station 10 may send a message relay request according to the 3G1X Circuit Services Notification Protocol in 3GPP2 document C.S0024-A. This protocol provides a mechanism for tunneling messages in both directions between the ANC 12 and the mobile station, which messages are formatted according to the protocol of 3G1X-EVDV. It has been suggested in 3GPP2 TSG-A document,A40-20030915 003r1_SKTQUALCOMMAirvana_CrossPagingStage2.pdf (available at: ftp://ftp.3gpp2.org/TSGA/Working/2003/0915-Calgary/TSG-A.4/A40-20030915-003r1_SKTQUALCOMMAirvana_CrossPagingStage2.pdf) that such tunneled messages could be transferred to the 3G1X-EVDV MSC. The present invention relays these messages directly to the 3G1X-EVDV BSC for direction action. The message relay request includes a type identifier, a network controller identifier and an embedded message. The type identifier identifies the message as a relay request, and the network controller identifier identifies the network controller to which the embedded message is directed. In the example of FIG. 2, the network controller identifier identifies the BSC 32 and the embedded message is a registration for the DV network 30.

According to the method of the present invention, the ANC 14 recognizes a message received according to the 3G1X Circuit Services Notification Protocol as a relay message request requesting that a message embedded therein be relayed to another network controller based on the type identifier. The ANC 14 then forms a relay message addressed to the network controller (e.g., the BSC 32) indicated by the network controller identifier in the message relay request. The relay message includes a type identifier, a mobile station identifier and the embedded message. The type identifier identifies the message as a relay message. The mobiles station identifier identifies the mobile station associated with the embedded message. The embedded message includes the information for the embedded message in the message relay request. In one embodiment, the embedded message from the message relay request is included unaltered in the relay message. The relay message is routed over the tunneling medium 40 to the BSC 32 according to well-known routing techniques used by the tunneling medium based on the address provided by the relay message.

The BSC 32 receives the relay message and recognizes the message as a relay message from the message identifier. Accordingly, the BSC 32 treats the embedded message as a message received from the mobile station identified by the mobile station identifier. In this example, the identified mobile station is mobile station 10 and the embedded message is a registration. According to well-known DV network procedures, the BSC 32 sends the registration to the MSC 34, the MSC 34 records the registration and sends an acceptance to the BSC 32. The BSC 32 then sends a relay message back to the ANC 14. This relay message is address to the ANC 14 and includes the registration acceptance as the embedded message.

The ANC 14 receives the relay message and recognizes the relay message as such from the message identifier. Because the relay message was not received from a mobile station, the ANC 14 knows the relay message is directed to a mobile station and determines the destination mobile station from the mobile station identifier in the relay message. The ANC 14 then sends a message relay response to the mobile station 10 according to the 3G1X Circuit Services Notification Protocol. The message relay response includes the registration acceptance received in the relay message from the BSC 32.

As demonstrated above, this embodied method of the present invention provides a method for transferring a message between network controllers operating according to different radio technologies. The following embodiments will take advantage of this messaging scheme in the context of facilitating the transfer or handoff of calls from one radio technology network to a different radio technology network.

Figure 3:
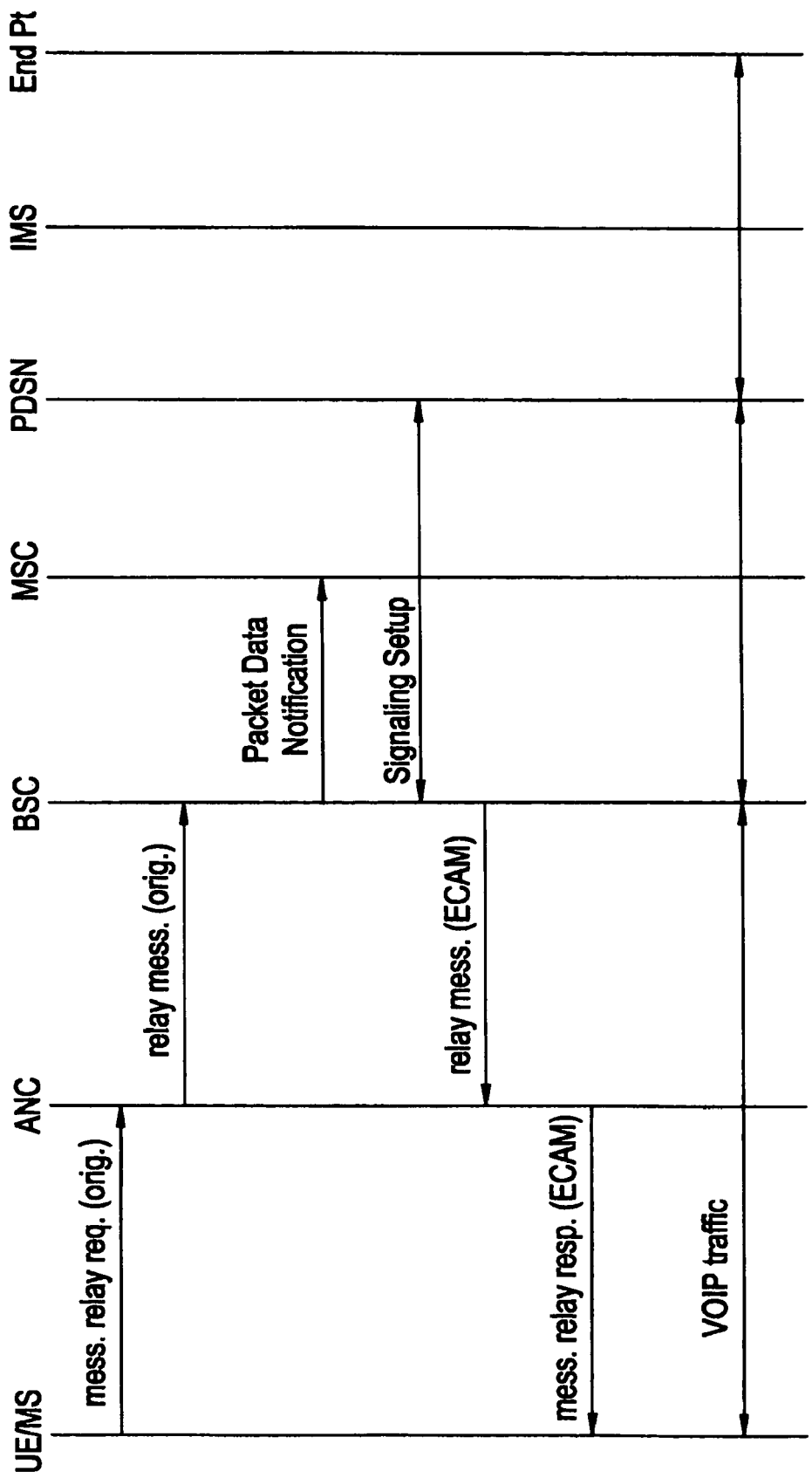

FIG. 3 illustrates a call flow diagram for transferring a VoIP call from the DO network 12 to a VoIP call on the DV network 30 according to the present invention that employs a message transfer method according to the present invention. The call flow diagram of FIG. 3 assumes the process described with respect to FIG. 2 has already taken place. In this method of the present invention, the UE 10 determines that transfer to the DV network 30 (and more specifically, the BSC 32 in the DV network 30) is necessary according to any well-known technique to maintain the VoIP call. The UE 10 then sends a message relay request to the ANC 14 that identifies the BSC 32 and includes a DV network origination request as the embedded message. Selection and identification of the BSC 32 may also occur as set forth in detail below in the System Selection section of this disclosure.

The ANC 14 sends the embedded message to the BSC 32 in a relay message. In response to the origination message, the BSC 32 allocates radio resources, formats information for transmission to the MSC 34, transmits this information to the MSC 34, and establishes a signaling relationship with the PDSN 16. The BSC 32 then formulates an Enhanced Channel Assignment Message (ECAM), which indicates a communication channel assigned to the mobile station 10 for communication of VoIP traffic with the BSC 32. The BSC 32 sends the ECAM to the ANC 14 in a relay message, The ANC 14 sends the ECAM to the mobile station 10 in a relay response message. During this operation, the DO network 12 continues to handle VoIP communication with the mobile station 10.

In response to the signaling relationship established by the BSC 32, the PDSN 16 begins bi-casting the VoIP traffic destined for the mobile station to both the ANC 14 and the BSC 32. This may be accomplished according to any well-known technique or according to that described in U.S. application Ser. No. 10/824,762, entitled METHOD FOR REDUCING SERVICE INTERRUPTIONS DURING A HANDOFF IN A WIRELESS NETWORK, filed Apr. 14, 2004 by inventors of the subject application; the entire contents of which are hereby incorporated by reference. Also in response to the information received from the BSC 32, the MSC 34 registers the mobile station in a home location register (not shown) of the DV network 30 if not previously registered.

After receiving the ECAM from the DO network 12, the mobile station 10 releases the call communication with the DO network 10. The mobile station 10 tunes to the DV network 30 and acquires the traffic channel assigned in the ECAM using known DV network procedures. Signaling according to the DV network procedures then takes place between the BSC 32 and the mobile station 10, and VoIP traffic begins to flow over the assigned traffic channel between the BSC 32 and the mobile station 10.

As shown, by providing for messaging between the network controllers, the VoIP call on DO network could continue while the VoIP call was established on the DV network. When the call transition does take place, it occurs quickly and significantly reduces any gap in communication that may result from the transition.

Figure 4:
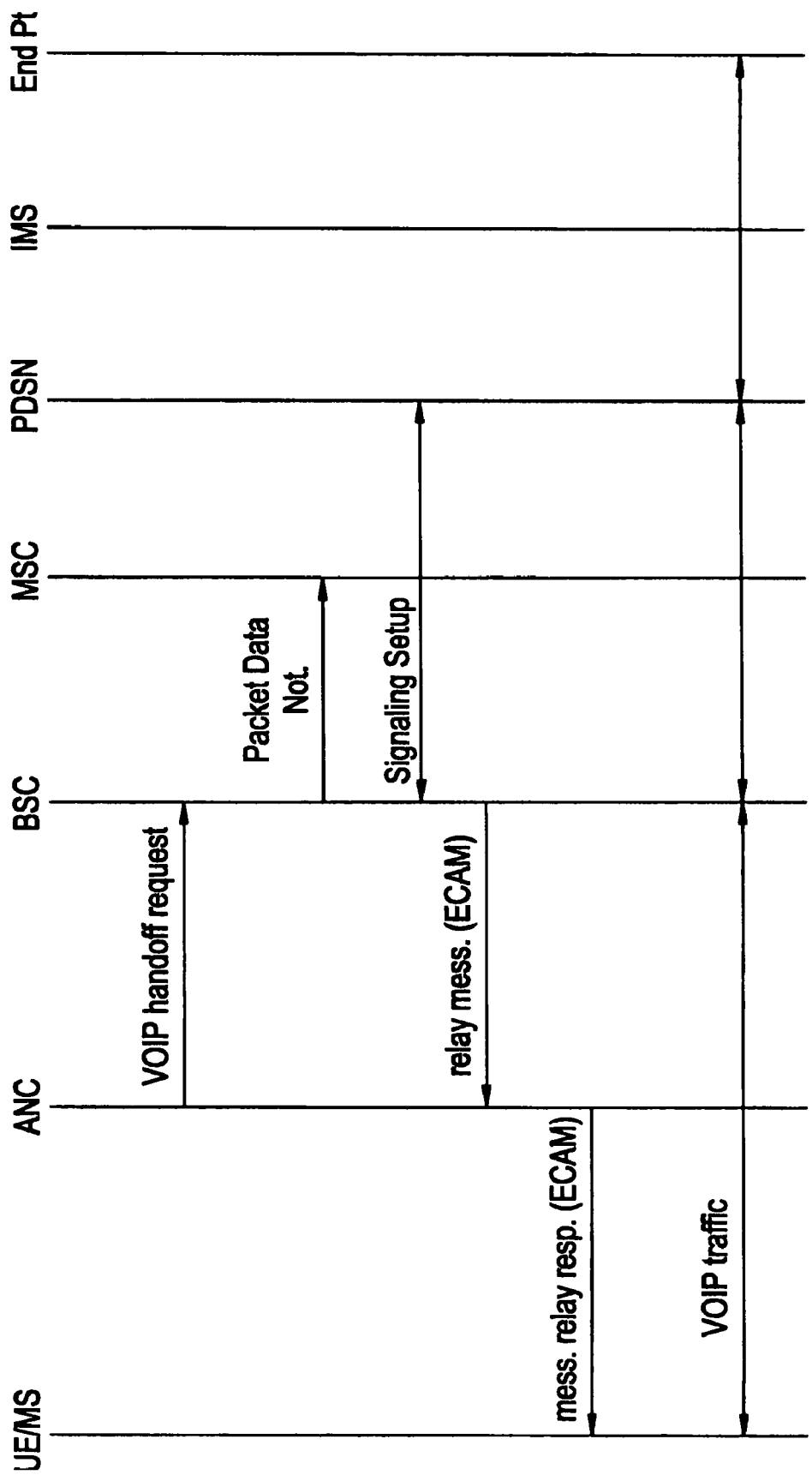

Next, another embodiment of the method for transferring messages between network controllers according to the present invention will be described with respect to another embodiment of a method of transferring a VoIP call according to the present invention. FIG. 4 illustrates a call flow diagram of this next method. The call flow diagram of FIG. 4 assumes the process described with respect to FIG. 2 has already taken place. In this method of the present invention, the ANC 14 determines according to any well-known handoff technique that the VoIP call should be handed off as a VoIP call to the BSC 32 of the DV network 30. As will be appreciated, according to known handoff procedures or as disclosed in the System Selection section below, the ANC 14 is informed of the neighboring network controllers and their capabilities (e.g., whether they provide VoIP service) and the handoff request identifies the mobile station being handed off. As will further be appreciated, the handoff request indicates that a VoIP to VoIP handoff is being requested. Assuming the BSC 32 can provide VoIP services for the identified mobile station, the BSC 32 allocates radio resources, formats information for transmission to the MSC 34, transmits this information to the MSC 34, and establishes a signaling relationship with the PDSN 16. The BSC 32 then formulates an Enhanced Channel Assignment Message (ECAM), which indicates a communication channel assigned to the mobile station 10 for communication of VoIP traffic with the BSC 32. The BSC 32 sends the ECAM to the ANC 14 in a relay message.

The ANC 14 sends the ECAM to the mobile station 10 in a relay response message. During this operation, the DO network 12 continues to handle VoIP communication with the mobile station 10.

In response to the signaling relationship established by the BSC 32, the PDSN 16 begins bi-casting the VoIP traffic destined for the mobile station to both the HRPD ANC 14 and the BSC 32. This may be accomplished according to any well-known technique or according to that described in U.S. application Ser. No. 10/824,762, entitled METHOD FOR REDUCING SERVICE INTERRUPTIONS DURING A HANDOFF IN A WIRELESS NETWORK, filed Apr. 14, 2004 by inventors of the subject application; the entire contents of which are hereby incorporated by reference. Also in response to the information received from the BSC 32, the MSC 34 registers the mobile station in a home location register (not shown) of the DV network 30 if not previously registered.

After receiving the ECAM from the DO network 12, the mobile station 10 releases the call communication with the DO network 10. The mobile station 10 tunes to the DV network 30 and acquires the traffic channel assigned in the ECAM using known DV network procedures. Signaling according to the DV network procedures then takes place between the BSC 32 and the mobile station 10, and VoIP traffic begins to flow over the assigned traffic channel between the BSC 32 and the mobile station 10.

As shown, by providing for messaging between the network controllers, the VoIP call on DO network could continue while the VoIP call was established on the DV network. When the call transition does take place, it occurs quickly and significantly reduces any gap in communication that may result from the transition.

Next, two methods of transferring messages according to the present invention to facilitate transition of a packet switched call to a circuit switched call will be described.

Figure 5:
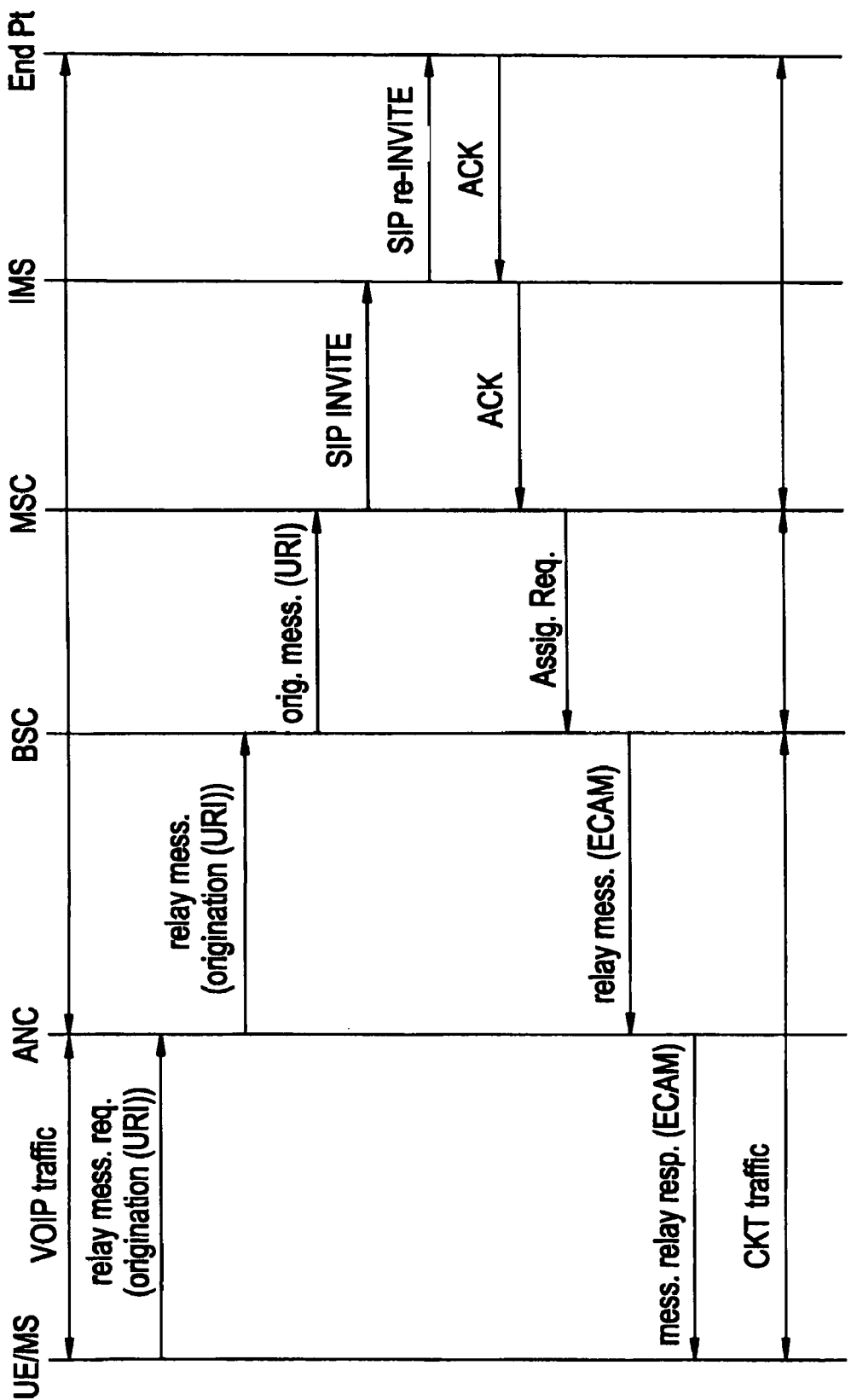

FIG. 5 illustrates a call flow diagram of a first method for transferring a packet switched call to a circuit switched call employing the method of transferring message according to the present invention. In this method, a UE 10 may register, in the conventional manner, with the DO network 12, the PDSN 16 and the IMS 22 (not shown). Afterwards, a VoIP call over the DO network 12 may be established in the conventional manner between the UE 10 and the end point 28. During the VoIP call, a call control agent function of the IMS 22 serves as a session-stateful proxy for the SIP signaling related to the VoIP session between the mobile station 10 and the end point 28. In this capacity, the IMS 22 accumulates information regarding the VoIP session such as identification of the end point, identification of the mobile station, etc.

As shown in FIG. 5, according to well-known techniques, the UE 10 may decide that the DO network 12 no longer provides acceptable service and that communication over the DV network 30 should take place (e.g., based on the received signal strengths from the DO network 12 and the DV network 30). Accordingly, the UE 10 sends a message relay request to the ANC 14 that identifies the BSC 32 and includes a DV network origination request as the embedded message. The origination request may request origination of circuit switched communication. Selection and identification of the BSC 32 may also occur as set forth in the System Selection section below. The ANC 14 sends the embedded message to the BSC 32 in a relay message. In response to the origination message, the BSC 32 allocates radio resources, formats information for transmission to the MSC 34, and transmits this information to the MSC 34.

As shown in FIG. 5, the origination request is made to a call transfer universal resource identifier (URI) previously provisioned in the UE 10 by the DV network 30. Namely, the called party number in the origination request is the call transfer URI. Upon receiving the origination request, the MSC 24 sends a SIP INVITE request to the IMS 22. As is known, a SIP INVITE request may be used as a form of call request to establish communication between two parties.

The SIP INVITE request includes the call transfer URI provided in the origination request as the Request URI. As a result, the SIP INVITE request is routed to a call transfer function at the IMS 22 for the UE 10. As will be appreciated, the IMS 22 may be comprised of one or more servers with various functional modules operating thereon.

In one embodiment, the call transfer URI is a public identifier provided for use by mobile stations to request call transfer of an ongoing packet switched call. In this embodiment, a service call transfer function at the IMS 22 receives the SIP INVITE request. Recognizing the Request URI as indicating call transfer, the service call transfer function proxies the INVITE request to a subscriber call transfer function at the IMS 22. Namely, the service call transfer function uses the calling party number for the UE 10 included in the origination request and thus in the SIP INVITE request to obtain a public identifier (e.g., public telecommunication number) for the UE 10 in the DV network 30. The calling party number may be a private or public identifier such as a telecommunication number for the UE in the DV network 30. The subscriber call transfer function treats a received SIP INVITE request as a call transfer request when the Request URI is the public identifier of a UE that is involved in a VoIP session.

The IMS 22 knows whether a UE is involved in a VoIP call because the IMS 22 will have proxied the VoIP call. Therefore, because the IMS 22 has proxied the SIP messages for the VoIP session of the UE 10 and the subscriber call transfer function receives the INVITE request with the public identifier of a UE 10 as the request URI, the call transfer function treats the INVITE request as a special case—a call transfer request.

In an alternative embodiment, the Request URI in the origination request and thus the SIP INVITE request sent by the MSC 34 is the public identifier of the UE in the DV network 30. In this embodiment, the SIP INVITE request may be directly routed to the subscriber call transfer function in the IMS 22, and determined to be a call transfer request. As will be appreciated, in this embodiment, the called and calling party numbers of the origination request may be the same.

When the IMS 22 determines that a call transfer request has been received for the UE 10, the IMS 22 sends a SIP re-INVITE request to the end point 28. As will be appreciated, because the call control agent within the IMS 22 served as the proxy for SIP signaling in the VoIP call between the UE 10 and the end point 28, the IMS 22 knows to direct the SIP re-INVITE request to the end point 28. Functionally, the SIP re-INVITE request serves to change the role of the IMS 22 with respect to the SIP signaling between the UE 10 and the end point 28. The SIP re-INVITE request requests the end point to agree to transition the IMS 22 from a call control agent (e.g., proxy server) for the call control path from the DO network 12 to a call control agent (e.g., back-to-back user agent) for a call control path from the DV network 30 to the end point 28. The call control agent (i.e., IMS 22), using back-to-back user agent procedures according to IETF RFC 3261, may establish this new call control path by using a target refresh request towards the end point 28 to take over as a call control agent for the mobile station 10 while responding directly to the INVITE request from the MSC 34 to act as the call control agent for the end point 28 towards the MSC 34. Thus the subscriber call transfer function in the IMS 22 acts as call control agent for both remaining portions of the new call control path while interworking the call control procedures between these two portions of the new call control path. The initial call control path from the DO network 12 no longer exists. The initial packet switched call between UE 10 and end point 28 transitions to a circuit switched call within the DV network 30. The DV network 30 and IMS 22 continue to support the exchange of voice media between the UE 10 and end point 28 after the transfer event to the DV network 30 until either party terminates the call using standard call termination procedures. When the call transfer function receives call control signaling indicating that one portion of the new call control path is terminated, it will also terminate the remaining portion of the new call control path.

FIG. 5 illustrates the end point 28 acknowledging the SIP re-INVITE request according to known SIP procedures. As the call control agent for a call control path from the DV network 30 to the end point 28, the IMS 22 establishes a bearer path from the UE 10 to the end point 28 over the DV network 30 that does not traverse through the IMS 22 according to well-known third party call control procedures for establishing such a bearer path (e.g., ftp://www.ietf.org/internet-drafts/draft-ietf-sipping-3pcc-06.txt). In FIG. 5, once the MSC 34 has received the Ack from IMS 22, it sends an Assignment Request message to the BSC 32 to cause the bearer path to be established within the DV network. The BSC 32 formats a radio enhanced channel assignment message (ECAM) and sends it to the DO ANC 14 to be relayed to the mobile station. The mobile station responds by the following DV procedures to establish a bearer channel on the DV network.

This embodiment provides for messaging between network controllers such that transferring a packet switched call to a circuit switched call can be accomplished without first terminating the packet switched call. As a result, the transition takes place quickly without requiring the user to manually re-establish the call.

Figure 6:
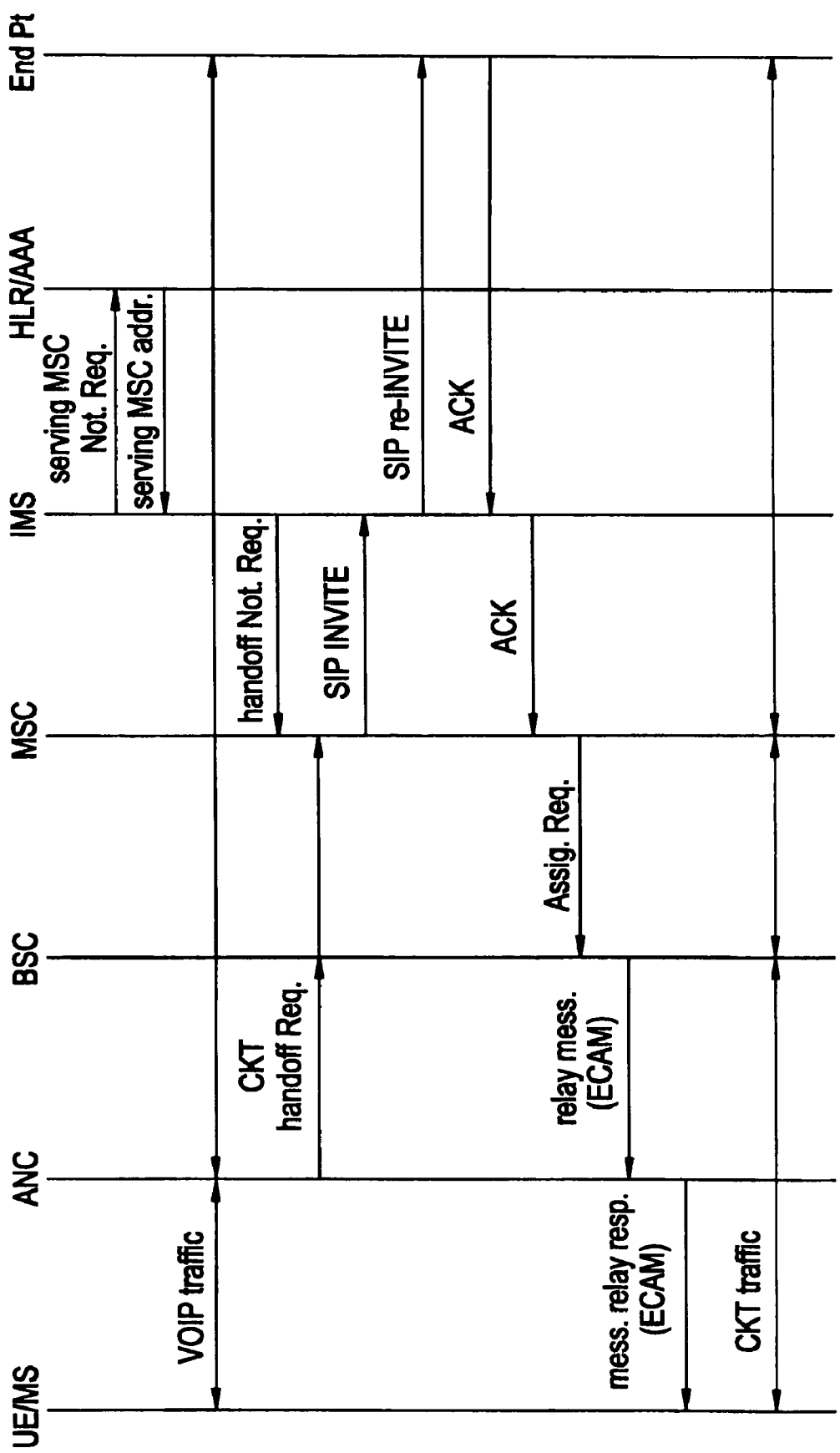

Next, a second example of employing the method of transferring messages between network controllers according to the present invention to facilitate transfer of a packet switched call to a circuit switched call will be described. FIG. 6 illustrates a call flow diagram of this example. A UE 10 registers, in the conventional manner, with the DO network 12, the PDSN 16 and the IMS 22 (not shown). Afterwards, a VoIP call over the DO network 12 may be established in the conventional manner between the UE 10 and the end point 28. During the VoIP call, a call control agent function of the IMS 22 serves as a session-stateful proxy for the SIP signaling related to the VoIP session between the mobile station 10 and the end point 28. In this capacity, the IMS 22 accumulates information regarding the VoIP session such as identification of the end point, identification of the mobile station, etc.

Furthermore, as shown in FIG. 6, after registration with the IMS and, in this embodiment, before the VoIP call is established, the IMS 22 sends a serving MSC address notification request to the HLR/AAA 30. While FIG. 6, shows this serving address notification request being sent prior to the VoIP call being established, it will be appreciated, that the serving address notification request may be sent after the VoIP call is established. Even if the DV network 30 is not currently serving a UE 10, the UE 10 may register with an MSC 34 in the DV network 30 at any time prior to the DV network receiving a handoff request for the mobile station 10, and may also register before the VoIP call is established as described above with respect to FIG. 2. This registration information is provided to the HLR/AAA 30. The HLR/AAA 30, in the known manner, stores this registration information along with the address or location of the MSC 34 that forwarded the registration information. The serving MSC address notification request according to one example embodiment is a SIP SUBSCRIBE request sent according to a SIP SUBSCRIBE method or procedure (e.g., such as set forth in SIP Version 2.0 as defined in IETF RFC 3261, IETF RFC 3265, and related specifications) with an event package that requires the HLR/AAA 30 to notify or inform the IMS 22 of the address for the MSC in the DV network 30 with which the UE 10 is currently registered (referred to as the "serving MSC"). Furthermore, according to this procedure the HLR/AAA 30 sends a notification of the new serving MSC address when the serving MSC changes. It will be appreciated that the SIP SUBSCRIBE method with this serving MSC address notification event package or procedure is but one example of how the IMS 22 may obtain the address or location of the serving MSC. For example, alternate protocols and procedures such as a Diameter protocol query/response may be used.

As shown in FIG. 6, the HLR/AAA 30 keeps the IMS 22 up-to-date on the address of the serving MSC in the DV network 30. The IMS 22 uses this address to send a handoff notification request to the serving MSC for the mobile station 10. While not shown in FIG. 6, each time the IMS 22 receives the serving MSC information indicating a new serving MSC, the IMS 22 sends a handoff notification request for the mobile station 10 to the new serving MSC. In the example embodiment shown in FIG. 6, the handoff notification request is only sent after the VoIP call on the DO network 12 has been established. This is done to avoid maintaining unnecessary state information at the MSC when no VoIP session is active. However, it will be appreciated that the present invention is not limited to this example. Instead, the handoff notification request may be sent after receiving a new serving MSC address and before a VoIP call is established on the DO network 12 for the UE 10.

FIG. 6 illustrates the handoff request being sent in a relay message from the ANC 14 to the BSC 32. The BSC 32 then sends the handoff request to the MSC 34.

The handoff notification request according to one example embodiment is a SIP SUBSCRIBE request sent according to a SIP SUBSCRIBE method or procedure (e.g., such as set forth in SIP Version 2.0 as defined in IETF RFC 3261, IETF RFC 3265, and related specifications) with an event package that requires the MSC receiving the request to notify or inform the IMS 22 of when the MSC 34 receives a handoff request for the UE 10. As will be appreciated, the handoff notification request identifies the mobile station that is the subject of the request (e.g., using a mobile station identifier provided by the mobile station during registration). Also, according to this procedure, the IMS 22 provides the serving MSC 34 with a network address for addressing a call transfer function for the mobile station 10 in the IMS 22. As will be appreciated, the IMS 22 may be comprised of one or more servers with various functional modules operating thereon. For each mobile station 10 registered with the IMS 22, a respective call transfer function is established. Each call transfer function has a network address or identifier; this identifier, according to the SIP protocol, is a universal resource identifier (URI).

Furthermore, the handoff notification procedure at the MSC requires, as shown in FIG. 6, that the MSC 34 generate a SIP INVITE request when a handoff is performed for the UE 10. As is known, a SIP INVITE request may be used as a form of call request to establish communication between two parties. According to the handoff notification procedure, the SIP INVITE request includes the URI provided in the handoff notification request as the Request URI in the SIP INVITE request. As a result, the SIP INVITE request is routed to the call transfer function at the IMS 22 for the UE 10.

FIG. 6 shows a handoff request sent by the ANC 14 to the BSC 32 in a relay message. The ANC 14 generates the handoff request according to any well-known handoff technique. The BSC 32 sends the handoff request to the MSC 34. When the MSC 34 processes at least some portion of the handoff request, the MSC 34 sends a SIP INVITE request as a call transfer request to the IMS 22.

Upon receipt of the SIP INVITE request, the IMS 22 functionally recognizes the request as a call transfer request, and sends a SIP re-INVITE request to the end point 28. As will be appreciated, because the call control agent within the IMS 22 served as the proxy for SIP signaling in the VoIP call between the UE 10 and the end point 28, the IMS 22 knows to direct the SIP re-INVITE request to the end point 28. Functionally, the SIP re-INVITE request serves to change the role of the IMS 22 with respect to the SIP signaling between the UE 10 and the end point 28. The SIP re-INVITE request requests the end point to agree to transition the IMS 22 from a call control agent (e.g., proxy server) for the call control path from the DO network 12 to a call control agent (e.g., back-to-back user agent) for a call control path from the DV network 30 to the end point 28. The call control agent (i.e., IMS 22), using back-to-back user agent procedures according to IETF RFC 3261, may establish this new call control path by using a target refresh request towards the end point 28 to take over as a call control agent for the mobile station 10 while responding directly to the INVITE request from the MSC 34 to act as the call control agent for the end point 28 towards the MSC 34. Thus the call transfer function in the IMS 22 acts as call control agent for both remaining portions of the new call control path while interworking the call control procedures between these two portions of the new call control path. The initial call control path from the DO network 12 no longer exists. The initial packet switched call between UE 10 and end point 28 transitions to a circuit switched call within the DV network 30 after the handoff event. The DV network 30 and IMS 22 continue to support the exchange of voice media between the UE 10 and end point 28 after the handoff event to the DV network 30 until either party terminates the call using standard call termination procedures. When the call transfer function receives call control signaling indicating that one portion of the new call control path is terminated, it will also terminate the remaining portion of the new call control path.

FIG. 6 illustrates the end point 28 acknowledging the SIP re-INVITE request according to known SIP procedures. As the call control agent for a call control path from the DV network 30 to the end point 28, the IMS 22 establishes a bearer path from the UE 10 to the end point 28 over the DV network 30 that does not traverse through the IMS 22 according to well-known third party call control procedures for establishing such a bearer path (e.g., ftp://www.ietf.org/internet-drafts/draft-ietf-sipping-3pcc-06.txt). In FIG. 6, once the MSC 34 has received the Ack from IMS 22, it sends an Assignment Request message to the BSC 32 to cause the bearer path to be established within the DV network. The BSC 32 formats a radio enhanced channel assignment message (ECAM) and sends it to the DO ANC 14 to be relayed to the mobile station. The mobile station responds by the following DV procedures to establish a bearer channel on the DV network.

This embodiment provides for messaging between network controllers such that handing off a packet switched call to a circuit switched call can be accomplished without first terminating the packet switched call. As a result, the transition takes place quickly without requiring the user to manually re-establish the call.

While the above embodiments of the present invention have been described using the example of a DO network as the packet switched network and the DV network as an example of the circuit switched network, the present invention is not limited to these two example networks. Instead, the present invention is applicable to any network supporting packet switched calls such as an 802.11 network, etc., and/or any network supporting circuit switched calls such as a 3GPP GSM or 3GPP UMTS. As such, the packet switched network and the circuit switched network may be two different radio networks or technologies, which are part of different or the same subscriber network, where the two parts support different degrees of IP quality of service (QoS). Accordingly, as used through this application and the claims, the term network covers different network or different network portions of a same network.

System Selection

Figure 7:
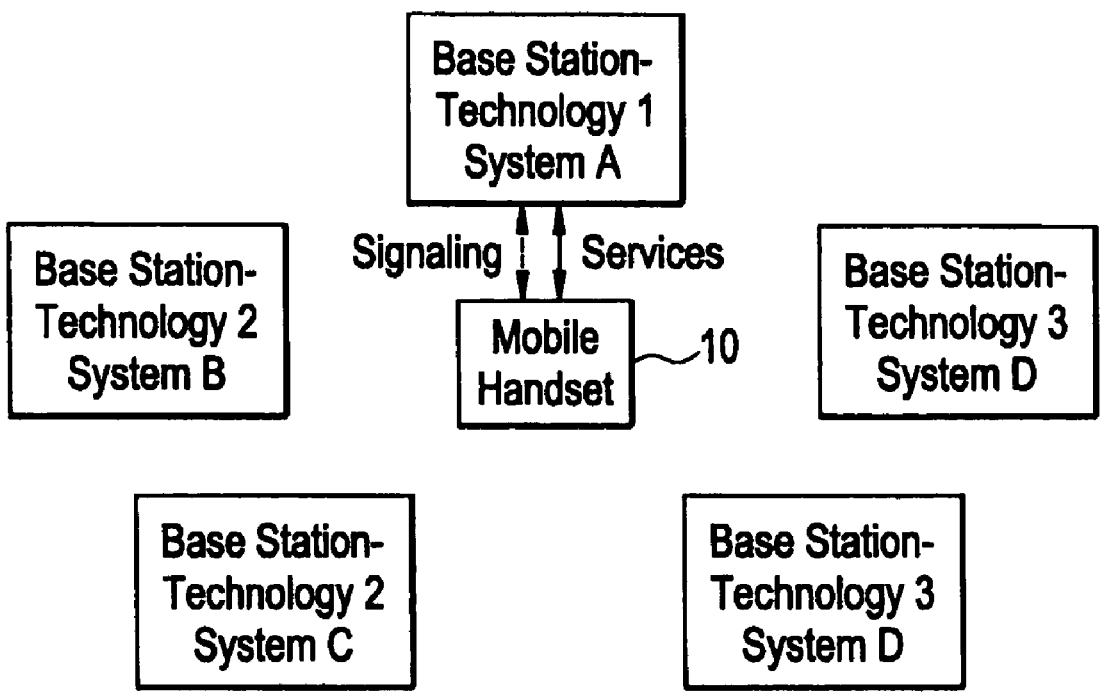
FIG. 7 illustrates a communications system in accordance with another exemplary embodiment of the present invention.
Figure 8:
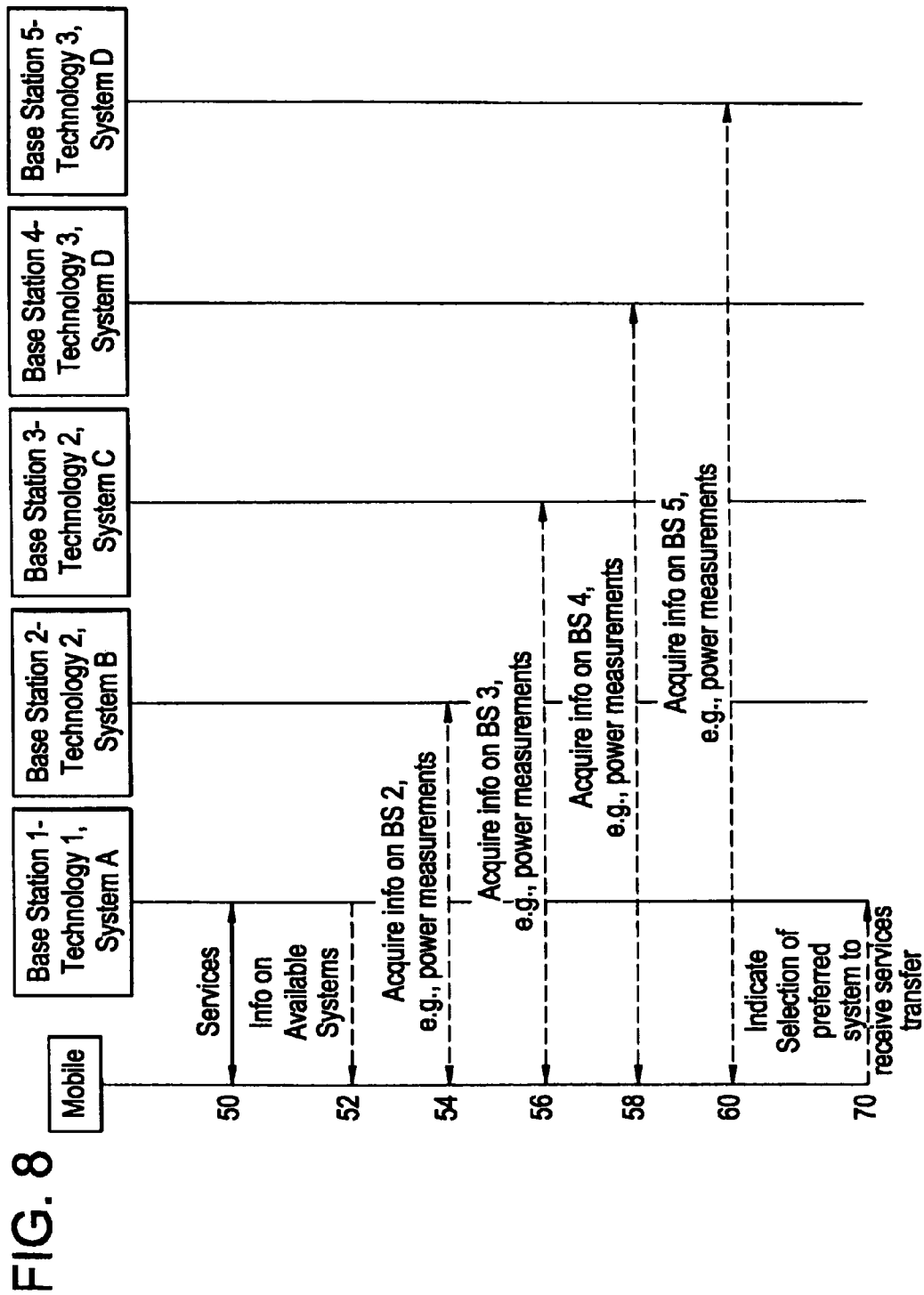
FIG. 8 is a series of messages exchanged in order to accomplish system selection in accordance with an exemplary embodiment of the present invention.

FIG. 7 illustrates an exemplary embodiment of the system selection mechanism according to the present invention. As shown, FIG. 7 includes a mobile station or handset 10 (as above, the terms mobile station, mobile handset, UE, etc. will be used interchangeably) and a plurality of base stations, BS1, BS2, BS3, . . . , BSN, where N=5, each from a variety of systems (A, B, C, D) and/or radio network technologies (1, 2, 3). Examples of radio network technologies include 3G1X-EVDV, HRPD, 802.11B, 802.11G, 802.16, 802.20, GSM, UMTS, and EDGE. Examples of systems include systems defined at the operator level, for example, Operator A wireless 3G1X-EVDV, Operator A wireless HRPD, 3G1X-EVDV Operator B PCS network, Operator C 802.11b network, or Operator D 802.11b network. As will be appreciated, different radio technologies use different terminology. For example, while a DV network calls a network controller a base station controller, a DO network calls the network controller an access network controller. For simplicity of description, this section of the application will generically refer to such network elements as base stations.

As indicated in FIGS. 7 and 9, the mobile handset 10 may be currently in communication with base station BS1. In an exemplary embodiment, BS1 supplies the mobile with one or more services 50. As the mobile handset 10 interacts with BS1 and the services it provides, BS1 may also provide the mobile handset 10 with information 52 on one or more other available systems in the neighbourhood of the mobile handset 10. For example, BS1 may provide the mobile handset 10 with information on neighbouring base stations BS2-BS5. The information 52 may include radio channel identification, band class identification, and radio technology type. BS1 may also indicate for each of BS2-BS5 whether BS1 can relay signaling to and/or from BS2-BS5. The mobile handset 10 may then take various actions to collect parameters 54, 56, 58, 60 from BS2-BS5. These actions and parameters 54, 56, 58, 60 may include measuring power and/or acquiring identification information, such as the conventional SID/NID identifier (System Identity/Network Identity). The mobile handset 10 may obtain these measurements and/or identifiers for some or all of BS2-BS5.

As shown in FIG. 9, the information 52 may include the pilot channel 522 for BS2-BSN, where N=9, what network type 524 each of BS2-BS9 is associated with and/or an indicator 526 as to whether BS1 can relay messages from the mobile handset 10 to BS2-BS9. In the example shown in FIG. 9, BS1 can relay messages from the mobile handset 10 to BS2-BS4 and BS7-BS8, but not to BS5-BS6 or BS9.

In an exemplary embodiment, the mobile handset 10 may acquire additional information on BS2-BS9 by making the necessary inquiries and/or measurements on its own. In another exemplary embodiment, any necessary parameters and/or identifiers may be provided by BS1 in a neighbour list. In another exemplary embodiment, BS1 may send a general neighbour list to the mobile handset 10, identifying in a general sense, the other base stations, for example, BS2-BS9, which are in the neighbourhood of the mobile handset 10. The mobile handset 10, after making inquiries to BS2-BS9, may request more specific, individual configuration information on a case by case basis, to BS1.

The mobile handset 10 may utilize the parameters and/or identifiers provided by BS1, the parameters and/or identifiers the mobile handset 10 has collected itself from BS2-BS9, and/or an internal priority list, in order to select a preferred system and/or prioritize the other base stations BS2-BS9 with regard to future or transferred services. The mobile handset 10 then forwards a selection to BS1, via an indication message 70.

In a more specific example of the present invention, the mobile handset 10 is currently communicating with a HRPD base station (BS1) via services 50. The HRPD base station (BS1) sends a message, such as the message 52 illustrated in FIG. 9 to the mobile handset 10, which indicates that there are eight (8) other base stations in the neighbourhood of the mobile handset 10. These eight (8) base stations (BS2-BS9) include an HRPD base station in system 1 (HRPD1), an HRPD base station in system 2 (HRPD2), a 3G1X-EVDV base station in system 1 (DV1), a 3G1X-EVDV base station in system 2 (DV2), a base station for wireless LAN 1 (WLAN1), a base station for wireless LAN 2 (WLAN2), a UMTS base station in system 3 (UMTS3) and a UMTS base station in system 4 (UMTS4). The message sent from the HRPD base station also indicates to which of base stations HRPD1, HRPD2, DV1, DV2, WLAN1, WLAN2, UMTS3, and UMTS4, the HRPD base station is capable of relaying messages.

In an exemplary embodiment, the mobile handset 10 retunes its receiver to be able to receive transmissions from each of the eight (8) base stations HRPD1, HRPD2, DV1, DV2, WLAN1, WLAN2, UMTS3, and UMTS4, and measures power and/or acquires the identity of each base station, such as an SID/NID identifier. Once the mobile handset 10 has acquired this information 54, 56, 58, 60, the mobile handset 10 may make a decision based on this information 54, 56, 58, 60, either with or without consulting a preferred roaming list and reports its selection to the HRPD base station (BS1) as indication message 70. The preferred roaming list for the mobile handset 10 may identify the hierarchy of other base stations (BS2-BS9) to which the mobile handset 10 should transfer services.

For example, the mobile handset's 10 preferred roaming list may indicate that if the mobile handset 10 can find a DV2 base station, that is its first priority for future transfer. The preferred roaming list may also indicate that if a DV2 base station is not available, the mobile station should attempt to transfer services to a base station in WLAN1. If a base station in WLAN1 is not available, the preferred roaming list may indicate that mobile handset 10 may transfer services to a base station in DV1. If that is the end of the mobile handset's 10 preferred roaming list, this may indicate that the mobile handset 10 cannot transfer to a base station in WLAN2, even if such a base station is in the neighbourhood of the mobile handset 10.

The preferred roaming list may also be augmented by an indication (for example relay information 526 illustrated in FIG. 9) of whether BS1 can relay messages to anyone or all of the base stations HRPD1, HRPD2, DV1, DV2, WLAN1, WLAN2, UMTS3, and UMTS4. In the example given above, the mobile handset's 10 first option in the priority roaming list may be that the DV2 base station is the first priority only if BS1 can relay messages to the DV2 base station. The relay indication may also be a choice for each of the preferred roaming list options as well.

In an exemplary embodiment, it is contemplated that BS1 and the mobile handset 10 will undertake the above described communications at various intervals, as system parameters change. For example, at various times, depending on the location of the mobile handset 10, various base stations in various systems may become unavailable or available to the mobile handset 10. It is further contemplated, that the mobile handset 10 and BS1 may initiate the above identified communication, in anticipation of a possible transfer of service from BS1 to another other base station BSN, based on the requirements and/or location of the mobile handset 10. It is contemplated that upon the decision that mobile handset 10 is ready to transfer to another base station, such a procedure, as identified above, may be beneficial, in order to ensure that the system configuration is as the mobile handset 10 expects, at the time of desired transfer. It is further contemplated in another exemplary embodiment, as a possibility, that either BS1 or one of BS2-BSN which the mobile handset 10 has selected, may modify, limit, or otherwise restrict, the mobile handset 10, thereby requiring a different choice by the mobile handset 10, under various circumstances.

In an exemplary embodiment, the message 52 includes information on more than one type technology base station.

In an exemplary embodiment, BS1 need not be able to translate, decipher manipulate, convert, or act on the messages passed to (or from) the mobile handset 10 to the other base stations BS2-BS4 and BS7-BS8, BS1 need only be able to relay the messages. In other exemplary embodiments, BS1 may translate, decipher manipulate, convert, or act on the messages passed to (or from) the mobile handset 10 to the other base stations BS2-BS4 and BS7-BS8.

In an exemplary embodiment, the mobile handset 10 need not actually transfer to any of BS2-BS9, but only need to be aware of their presence in case a transfer becomes necessary in the future.

Although exemplary embodiments of the present invention have been discussed above in the context of specific numbers of mobile handsets, base stations, systems, and radio network technologies, the present invention is not limited to any specific numbers of any of these. Also, although exemplary embodiments of the present invention have been discussed above in the context of specific pilot frequencies and specific types of base stations (HRPD, 3G1X-EVDV, WLAN, UMTS), the present invention is not limited to any types or combinations of types.

In exemplary embodiments, the mobile handset may be a mobile phone of any type, a personal digital assistant (PDA), a hand-held computer, a mobile-user station, or a mobile processing device of any type.

In exemplary embodiments, each of the plurality of base stations, BS1, BS2, BS3, . . . , BSN may be either a dumb or smart base station, base station controller (BSC), a radio network controller (RNC), or an access network controller (ANC). As set forth above, the mobile handset may make its determination based on any combination of information received from the base station that currently provides the mobile handset with service, information received from the base stations that the base station currently providing service indicates are in the neighbourhood of the mobile handset with service, and/or information the mobile handset already has (such as a preferred roaming list, for example).

In an exemplary embodiment, the present invention may provide the ability to choose between multiple other systems, provide feature transparency after transfer between two systems, and/or provide a more seamless voice over internet protocol ("VoIP") handoff between two systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

We claim:

1. A method comprising:
receiving, at a first network controller operating according to a first radio technology, a message relay request from a mobile station for which the first network controller is handling a packet switched call, the message relay request including a network controller identifier identifying a second network controller operating according to a second radio technology capable of receiving a signal from the mobile station and the message relay request including an origination message for originating a call at the second network controller operating according to the second radio technology, and the second radio technology being different from the first radio technology; forming, at the first network controller operating according to a first radio technology, a relay message to include the origination message as an embedded message for conveying a switch in radio technology; and sending, by the first network controller operating according to a first radio technology, the relay message over a tunneling medium to the second network controller operating according to the second radio technology.

2. The method of claim 1, wherein the message relay request includes an identifier identifying the message relay request as the message relay request.

3. The method of claim 1, wherein the forming step further includes in the relay message an identifier of a packet data serving node handling the packet switched call of the mobile station.

4. The method of claim 1, further comprising:
receiving a second relay message, from the second network controller, including a channel assignment message, the channel assignment message indicating a channel assigned to the mobile station for communicating with the second network controller; and sending a message relay response to the mobile station that includes the channel assignment message.

5. The method of claim 1, wherein the embedded message is a handoff request requesting handoff of the mobile station to the second radio technology.

6. The method of claim 1, wherein the embedded message is a transition message requesting transition of the packet switched call for the mobile station handled by the first radio technology to a call for the mobile station handled by the second radio technology.

7. The method of claim 6, wherein the transition message requests transition of the packet switched call for the mobile station handled by the first radio technology to another packet switched call for the mobile station handled by the second radio technology.

8. The method of claim 6, wherein the transition message requests transition of the packet switched call for the mobile station handled by the first radio technology to a circuit switched call for the mobile station handled by the second radio technology.

9. The method of claim 1, wherein upon receiving the relay message, the second network controller performs a registration process with a mobile switching center of the second radio technology.

10. A method, comprising:
receiving a relay message including an origination message as an embedded message for conveying a switch in radio technology from a first network controller operating according to a first radio technology at a second network controller operating according to a different, second radio technology, and capable of receiving a signal from the mobile station, the relay message (i) including a transition message indicating to transition a packet switched call for a mobile station handled by the first network controller operating according to the first radio technology to a call for the mobile station handled by the second network controller operating according to the second radio technology, (ii) being sent over a tunneling medium between the first network controller operating according to the first radio technology and the second network controller operating according to the second radio technology, and (iii) being based on a message relay received from the first network controller operating according to the first radio technology, the message relay request including the origination message and a network controller identifier identifying the second network controller operating according to the second radio technology.

11. The method of claim 10, wherein the transition message is an origination message for originating a call with the second network controller.

12. The method of claim 10, wherein the relay message further includes an identifier of a packet data serving node handling the packet switched call of the mobile station.

13. The method of claim 12, further comprising:
establishing a signaling relationship with the identified packet data serving node such that the second network controller receives packetized traffic destined for the mobile station.

14. The method of claim 10, wherein the transition message is a handoff request requesting handoff of the mobile station to the second network controller.

15. The method of claim 10, further comprising:
sending a second relay message including a channel assignment message to the first network controller, the channel assignment message indicating a channel assigned to the mobile station for communicating with the second network controller.

16. The method of claim 10, wherein the transition message is for transitioning the packet switched call handled by the first network controller to another packet switched call handled by the second network controller.

17. The method of claim 10, wherein the transition message is for transitioning the packet switched call handled by the first network controller to a circuit switched call handled by the second network controller.

18. A method of communication between wireless elements and a wireless unit, the method comprising:
sending to a wireless unit at least one message identifying (i) wireless elements in use by a wireless unit and (ii) wireless elements available to the wireless unit for each of a plurality of network types;
receiving a selection of at least one selected wireless element from the wireless unit, the at least one message sent to the wireless unit includes an indicator of whether the wireless element in use by the wireless unit can relay messages to the at least one selected wireless element; and
communicating, by the wireless unit to a current wireless element, in use by the wireless unit, the selection of the at least one selected wireless element to subsequently relay messages.

19. The method of claim 18, wherein the at least one message includes at least one of an identifier of a network type of the wireless elements available to the wireless unit, and an indicator of whether the wireless element in use by the wireless unit can relay messages to the at least one selected wireless element.

20. The method of claim 18, wherein the at least one message includes network configuration parameters to identify at least one of the plurality of network types of the wireless elements available to the wireless unit.

21. The method of claim 18, wherein the message identifies at least one of the plurality of network types of the wireless elements available to the wireless unit.

22. The method of claim 18, wherein the at least one message includes parameters with which the wireless unit may select one of the wireless elements available to the wireless unit.

23. The method of claim 18, wherein the current wireless element at least one of, (i) relays messages to and (ii) relays messages from the at least one selected wireless element from the wireless unit.

24. The method of claim 18, whereupon (i) a selection of one of the wireless elements available to the wireless unit by the wireless unit and (ii) confirmation by the current wireless element, the current wireless element at least one of,
relays messages to the selected wireless element from the wireless unit, and
relays messages from the selected wireless element to the wireless unit.

25. The method of claim 18, wherein a message identifying the at least one selected wireless element indicates that at least one of subsequent messages to and subsequent messages from the wireless unit are to be relayed by the current wireless element.

26. The method of claim 18, wherein at least one of (i) each message to be relayed to and (ii) each message to be relayed from the wireless unit by the current wireless element identifies the at least one selected wireless element to which the each message is to be relayed.

27. A method of communication between wireless elements and a wireless unit, the method comprising:
receiving, by a wireless unit, at least one message identifying (i) wireless elements in use by a wireless unit and (ii) wireless elements available to the wireless unit for each of a plurality of network types;
selecting, by a wireless unit, at least one selected wireless element for possible future service based on the at least one message, the at least one message includes an indicator of whether the wireless elements in use by the wireless unit can relay messages to at least one selected wireless element; and
communicating, by the wireless unit to a current wireless element, in use by the wireless unit, the selection of the at least one selected wireless element to subsequently relay messages.

28. The method of claim 27, wherein the at least one message includes at least one of an identifier of a network type of the wireless elements available to the wireless unit, and an indicator of whether the wireless element in use by the wireless unit can relay messages to the at least one selected wireless element.

29. The method of claim 27, wherein the at least one message includes network configuration parameters to identify at least one of the plurality of network types of the wireless elements available to the wireless unit.

30. The method of claim 27, wherein the message identifies at least one of the plurality of one network types of the wireless elements available to the wireless unit.

31. The method of claim 27, wherein the at least one message includes parameters with which the wireless unit may select one of the wireless elements available to the wireless unit.

32. The method of claim 27, wherein the wireless unit selects one of the wireless elements for service based on the at least one message and a preferred roaming list.

33. The method of claim 32, wherein the current wireless element at least one of, (i) relays messages to and (ii) relays messages from the at least one selected wireless element from the wireless unit.

34. The method of claim 27, whereupon (i) a selection of one of the wireless elements available to the wireless unit by the wireless unit and (ii) confirmation by the current wireless element, the current wireless element at least one of,
relays messages to the selected wireless element from the wireless unit, and
relays messages from the selected wireless element to the wireless unit.

35. The method of claim 27, wherein a message identifying the at least one selected wireless element indicates that at least one of subsequent messages to and subsequent messages from the wireless unit are to be relayed by the current wireless element.

36. The method of claim 27, wherein at least one of (i) each message to be relayed to and (ii) each message to be relayed from the wireless unit by the current wireless element identifies the at least one selected wireless element to which the each message is to be relayed.

37. The method of claim 27, further comprising:
prior to selecting, requesting additional information on the wireless elements available to the wireless unit from a current wireless element.

* * * * *